(12) United States Patent
Bouchier et al.

(10) Patent No.: US 11,957,075 B2
(45) Date of Patent: Apr. 16, 2024

(54) SYSTEMS AND METHODS FOR IMPROVED BUCKER INSERTION

(71) Applicants: Evan Anton Bouchier, Issaquah, WA (US); Jesse Kenyon, Salt Lake City, UT (US); Bill Belcourt, Salt Lake City, UT (US)

(72) Inventors: Evan Anton Bouchier, Issaquah, WA (US); Jesse Kenyon, Salt Lake City, UT (US); Bill Belcourt, Salt Lake City, UT (US)

(73) Assignee: FRAZER INDUSTRIES LLC, Ketchum, ID (US)

(*) Notice: Subject to any disclaimer, the term of this patent is extended or adjusted under 35 U.S.C. 154(b) by 376 days.

(21) Appl. No.: 17/561,965

(22) Filed: Dec. 26, 2021

(65) Prior Publication Data

US 2022/0211093 A1 Jul. 7, 2022

Related U.S. Application Data

(60) Provisional application No. 63/133,316, filed on Jan. 2, 2021.

(51) Int. Cl.
*A01D 45/06* (2006.01)
(52) U.S. Cl.
CPC .................. *A01D 45/065* (2013.01)
(58) Field of Classification Search
CPC ............ A01D 45/065; A01G 2003/007; A01G 2005/005
See application file for complete search history.

(56) References Cited

U.S. PATENT DOCUMENTS

| 1,678,134 | A | * | 7/1928 | Cromer | ................ | A01D 45/065 |
| | | | | | | 56/182 |
| 2,343,963 | A | * | 3/1944 | Benham | ............... | A01D 45/065 |
| | | | | | | 56/14.4 |

(Continued)

FOREIGN PATENT DOCUMENTS

| AU | 2017325569 | A1 | * | 3/2019 | ............. | A01D 46/02 |
| CA | 2665876 | A1 | * | 11/2010 | ............. | A23N 15/01 |

(Continued)

*Primary Examiner* — Alicia Torres
*Assistant Examiner* — Ashley A Kaercher
(74) *Attorney, Agent, or Firm* — Trent H. Baker; BAKER IP PLLC

(57) ABSTRACT

One embodiment of the present invention relates to an insertion plate disposed on an external surface of a cannabis bucking machine configured to receive cannabis plants containing stems and buds. The insertion plate includes a top surface, a first angled surface, a second angled surface, and a bottom surface. One or more additional angled surfaces may also be included. The first angled surface includes a plurality of insertion recesses and the second angled surface includes a plurality of insertion channels. The insertion recesses and channels are substantially conically shaped to function as a funnel for receiving larger cannabis bunches. The unique correspondence between the angle of the surfaces and the shape of the recesses allows feeders to efficiently insert larger cannabis bunches and continue to feed as the bunches are levered down from the insertion recesses to the insertion channels.

20 Claims, 5 Drawing Sheets

(56) References Cited

U.S. PATENT DOCUMENTS

| | | | | |
|---|---|---|---|---|
| 2,646,621 | A * | 7/1953 | Catanese | A01G 5/00 47/1.01 R |
| 2,906,394 | A * | 9/1959 | Cary | A01D 45/065 198/523 |
| 4,744,373 | A * | 5/1988 | Miyake | A01D 45/16 460/136 |
| 4,773,434 | A * | 9/1988 | Miyake | A01D 45/16 131/319 |
| 10,028,618 | B1 * | 7/2018 | Benson | B02C 18/2216 |
| 10,357,803 | B2 * | 7/2019 | Greenwood | B07B 7/00 |
| 10,422,687 | B1 * | 9/2019 | Olgeirsson | G01G 19/393 |
| 10,709,070 | B1 * | 7/2020 | Wilkins | A01D 45/065 |
| 10,758,940 | B1 * | 9/2020 | Young | B07B 1/02 |
| 11,618,178 | B2 * | 4/2023 | Raichart | B26D 3/24 83/13 |
| 2005/0161566 | A1 * | 7/2005 | Tusting | A63B 29/024 248/231.9 |
| 2016/0374386 | A1 * | 12/2016 | Desmarais | A24B 5/06 460/137 |
| 2017/0197217 | A1 * | 7/2017 | Bruggemann | A23N 15/00 |
| 2018/0126578 | A1 * | 5/2018 | Raichart | B26D 1/0006 |
| 2018/0303033 | A1 * | 10/2018 | Jones | A23N 15/00 |
| 2018/0339298 | A1 * | 11/2018 | Mayers | B03B 4/02 |
| 2020/0122188 | A1 * | 4/2020 | Tumey | B05C 17/0053 |
| 2021/0022388 | A1 * | 1/2021 | Sullivan | A24C 5/02 |
| 2021/0092905 | A1 * | 4/2021 | Bruggemann | A01G 3/00 |
| 2021/0169119 | A1 * | 6/2021 | Jasiewicz | A01D 46/28 |
| 2021/0237093 | A1 * | 8/2021 | Archie | B02C 4/42 |
| 2021/0291192 | A1 * | 9/2021 | Kolbet | A01G 17/02 |
| 2021/0392940 | A1 * | 12/2021 | Jasiewicz | A23N 15/02 |
| 2022/0211093 | A1 * | 7/2022 | Bouchier | A24B 5/06 |
| 2022/0264800 | A1 * | 8/2022 | Schwenk | A01D 1/14 |
| 2022/0369565 | A1 * | 11/2022 | Stanton | A01G 3/00 |
| 2022/0394930 | A1 * | 12/2022 | Tamblyn | A01G 3/08 |
| 2023/0225249 | A1 * | 7/2023 | Sullivan | A01D 45/065 56/158 |

FOREIGN PATENT DOCUMENTS

| | | | | |
|---|---|---|---|---|
| CA | 2985587 | A1 * | 1/2018 | A01G 3/00 |
| CA | 3001150 | A1 * | 3/2018 | A01D 46/02 |
| CN | 107529393 | A * | 1/2018 | A01D 45/065 |
| CN | 108093845 | A * | 6/2018 | A01D 45/065 |
| CN | 108811715 | A * | 11/2018 | A01D 43/00 |
| CN | 109997502 | A * | 7/2019 | |
| CN | 113229090 | A * | 8/2021 | A01C 21/005 |
| CN | 114097404 | A * | 3/2022 | |
| CN | 115137093 | B * | 5/2023 | |
| DE | 19647433 | A1 * | 5/1998 | A01D 45/065 |
| DE | 202013100789 | U1 * | 5/2013 | B26D 1/29 |
| EP | 4295706 | A2 * | 12/2023 | A24C 5/002 |
| ES | 1143484 | U * | 9/2015 | |
| ES | 1262284 | U * | 3/2021 | |
| NL | 1018066 | C2 * | 11/2002 | A01G 5/00 |
| WO | WO-2010130035 | A1 * | 11/2010 | A23N 15/01 |
| WO | WO-2018204875 | A1 * | 11/2018 | A01D 46/22 |
| WO | WO-2019161509 | A1 * | 8/2019 | |
| WO | WO-2019169488 | A1 * | 9/2019 | A47B 13/08 |
| WO | WO-2019173901 | A1 * | 9/2019 | |
| WO | WO-2020047428 | A1 * | 3/2020 | A24C 5/002 |
| WO | WO-2021067418 | A1 * | 4/2021 | A01D 45/065 |
| WO | WO-2023087097 | A1 * | 5/2023 | |

* cited by examiner

SYSTEMS AND METHODS FOR IMPROVED BUCKER INSERTION

RELATED APPLICATIONS

This application claims priority to U.S. provisional application Ser. No. 63/133,316 filed Jan. 2, 2021, the contents of which are incorporated by reference.

FIELD OF THE INVENTION

The invention generally relates to systems and methods for medicinal and recreational cannabis harvesting. In particular, the present invention relates to systems and methods for improved bucker insertion.

BACKGROUND OF THE INVENTION

Cannabis plants are now commonly grown to facilitate the increasing demand for medicinal and recreational cannabis products. The legalization of cannabis has increased the demand for higher quality cannabis products at regulated prices. Therefore, farmers and growers are seeking solutions to increase harvest efficiency while maintaining quality. The growing and harvesting of cannabis plants is a multi-step process that was traditionally performed entirely by hand.

Cannabis plants grow in a bush-like configuration, including a plurality of intertwined stems with leaves and buds. The stems of the plant contain less than desirable amounts of the cannabis components. Therefore, one of the primary steps in harvesting cannabis plants is separating the desirable leaves and buds from the undesirable stems. Conventional manual processes for the separation step include holding the stem with one hand while simultaneously pulling off the leaves and buds with the opposite hand, or cutting the buds from the stem with scissors. There are many challenges in removing the leaves and buds from the stems. For example, cannabis stems may include a wide variety of diameters, depending on the size of the plant and proximity of the stem to the roots. Likewise, different types or strains of cannabis may include different strengths such as stem deformation, leaf bonding, bud bonding, etc.

Large scale cannabis growers have increasingly utilized machines known as buckers (also known as destemmers and debudders) to efficiently remove the buds from the stems. Bucker machines are operated by one or more feeders who selectively insert cannabis plants into the machine for the automatic separation of the buds from the stems, a process referred to as bucking. To prevent injury to the feeders, commercial bucking machines are usually encased in a housing that includes one or more feeding or input holes, commonly referred to as die. The die holes are located on a die plate or insertion plate positioned on a front portion of the bucker machine, while a separate output hole for the stems is located on a different side. As the bunches are pulled through the die holes, the buds are stripped off and fall into some type of bin or conveyor belt positioned below the die plate. This configuration allows the feeders to safely insert the plant through one of the die holes for automatic processing without risking injury. To facilitate different sized stems, the die plate often includes a plurality of circular die holes of varying diameter. The feeder will then insert the stem side of the plant into the appropriately sized die hole.

One of the known problems or limitations of conventional buckers is the limited size of cannabis plant bunches that can be properly processed/bucked. It is well known that larger cannabis stems or bunches cannot be fed into the machine without clogging or impeding the process. Therefore, additional preparation and cutting of larger cannabis plants is necessary before inserting into the bucking machine, thereby decreasing the efficiency of the overall process.

Therefore, there is a need in the industry for systems and methods of improved bucking insertion that expand the size and shape range of cannabis plants or bunches that may be inserted into a bucking system.

SUMMARY OF THE INVENTION

The present invention relates to systems and methods for medicinal and recreational cannabis harvesting. One embodiment of the present invention relates to an insertion plate disposed on an external surface of a cannabis bucking machine configured to receive cannabis plants containing stems and buds. The insertion plate generally includes a top surface, a first angled surface, a second angled surface, and a bottom surface. One or more additional angled surfaces may also be included. The first angled surface includes a plurality of insertion recesses and the second angled surface includes a plurality of insertion channels. The insertion recesses and channels are aligned, and together they are substantially conically shaped to function as a funnel for receiving larger cannabis bunches. The unique correspondence between the angle of the surfaces and the shape of the recesses allows feeders to efficiently insert larger cannabis bunches and continue to feed as the bunches are levered down from the insertion recesses on the first angled surface to the insertion channels on the second angle surface. A second embodiment of the present invention relates to a method of inserting cannabis bunches into a bucker at an initial elevated incident angle into the insertion recesses and lowering the bunches down into the insertion channels as the bunch is received and reduced into the machine.

Embodiments of the present invention represent a significant advance in the field of cannabis bucking. Conventional cannabis buckers include a single-dimension (flat) die plate with a plurality of hole diameters. However, the die plate maintains a fixed distance to the choke point of the bucking machine; therefore, if a large bunch is inserted into the bucker, it will likely clog or obstruct the machine because a longer distance to the choke point is necessary. Embodiments of the present invention provide a unique system of dynamically increasing the distance to the choke point by allowing feeders to insert cannabis bunches at an elevated angle through a recess, and then lower the bunch as the machine grabs the bunch and begins processing. The distance to the choke point is initially increased by the elevated incident angle at which the cannabis bunch is inserted and then subsequently decreased as the bunch is lowered. The unique combination of surface angles and recess shapes of the insertion plate provides a significant advance in cannabis harvesting efficiency.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

Figure 1A:
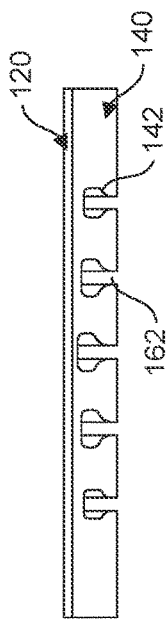
FIGS. 1A-D illustrates a plurality of views of a cannabis bucker insertion plate in accordance with embodiments of the present invention.
Figure 1B:
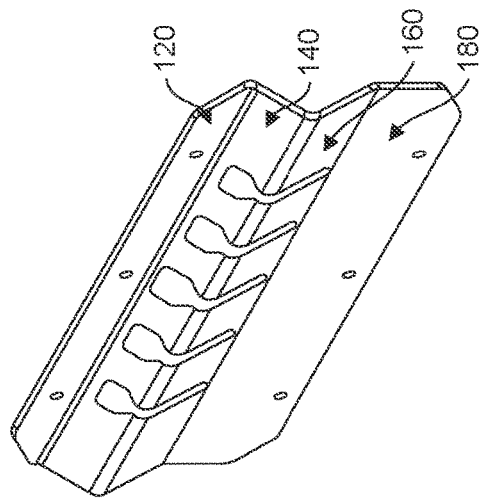
Figure 1C:
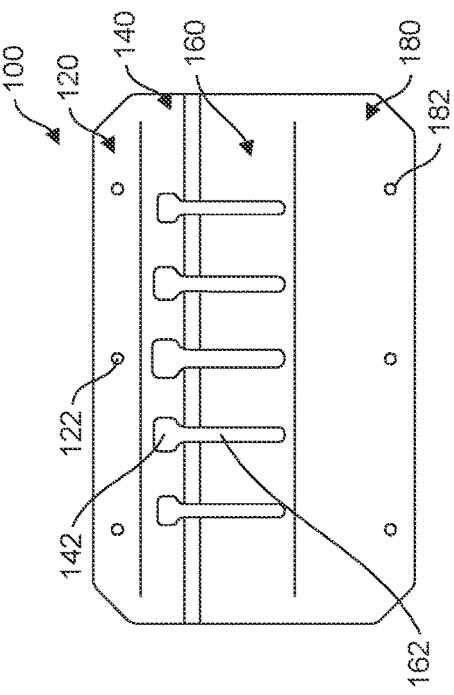

The present invention relates to systems and methods for medicinal and recreational cannabis harvesting. One embodiment of the present invention relates to an insertion plate disposed on an external surface of a cannabis bucking machine configured to receive cannabis plants containing stems and buds. The insertion plate generally includes a top surface, a first angled surface, a second angled surface, and a bottom surface. One or more additional angled surfaces may also be included. The first angled surface includes a plurality of insertion recesses, and the second angled surface includes a plurality of insertion channels. The insertion recesses and channels are aligned, and together they are substantially conically shaped to function as a funnel for receiving larger cannabis bunches. The unique correspondence between the angle of the surfaces and the shape of the recesses allows feeders to efficiently insert larger cannabis bunches and continue to feed as the bunches are levered down from the insertion recesses on the first angled surface to the insertion channels on the second angle surface. A second embodiment of the present invention relates to a method of inserting cannabis bunches into a bucker at an initial elevated incident angle into the insertion recesses and lowering the bunches down into the insertion channels as the bunch is received and reduced into the machine. Also, while embodiments are described in reference to a cannabis bucker die plate, it will be appreciated that the teachings of the present invention are applicable to other areas.

Reference is initially made to FIGS. 1A-D, which illustrates various views of a novel insertion plate system to be disposed on an external surface of a cannabis bucking machine configured to receive cannabis plants containing stems and buds, designated generally at 100. The illustrated insertion plate is configured to be used on a cannabis bucker machine, which receives cannabis bunches and then pulls the bunches between two rollers, tracks, belts or through another stem traction system. As the bunches are pulled into the machine, the buds are stripped from the stem and fall into a receptacle below the insertion plate 100. The stems are pulled through the machine and disposed in a separate receptacle. The insertion plate 100 is a critical component of the bucking system, allowing feeders to both safely feed the bunches (stems and buds) into the machine but also strip the buds from the stem as the bunch is pulled.

The insertion plate 100 includes a top surface 120, a first angled surface 140, a second angled surface 160, and a bottom surface 180. The insertion plate may be composed of any material preferably having rigid properties such as metal to prevent deformation during use. It is also well known in the industry that the material used on the insertion plate should also include a sufficiently sharp internal edge to trim the plant material from the stem during operation. The top surface 120 and bottom surface 180 are fixably coupled to the cannabis bucking system and may include a plurality of top coupling recesses 122 and bottom coupling recesses 182. The top and bottom coupling recesses 122, 182 may be used to rivet, bolt, or otherwise attach the insertion plate 100 to the cannabis bucking system. The top surface 120 is generally flat and/or orthogonal to a direction of pulling of the cannabis bucking machine (shown in FIG. 5). The direction of pulling is an angle at which bunches are pulled through the cannabis bucking machine. The direction of pulling may also correspond to a set of rollers, tracks, or belts through which the bunches are pulled. For example, the direction of pulling may be orthogonal to the axis of rotation of the rollers, tracks, or belts through which the bunches are pulled.

Figure 1D:
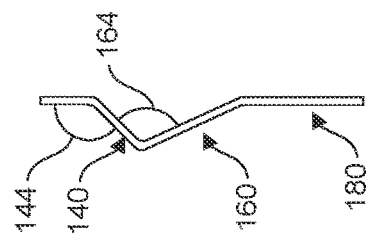

The first angled surface is coupled directly to a portion of the top surface. Although described as coupled, it will be appreciated that the surfaces may be formed by bending adjacent sections of material rather than coupling independent sections to one another. The first angled surface 140 is directly coupled to the top surface 120 at an external angle 144 between 90 and 180 degrees. The external angle 144 is defined as the angle between the top surface 120 and the first angled surface 140 opposite the cannabis bucking system or facing outward, as shown in FIG. 1D. The nature of the external angle 144 therefore orients the surface of the first angle surface 140 up towards the user. This orientation has the effect of increasing the distance to the choke point of the cannabis bucking system. The first angled surface 140 further includes plurality of insertion recesses 142. The illustrated insertion recesses 142 are substantially rectangular but include a tapered region at the bottom. The illustrated insertion recesses 142 are equidistantly spaced apart, disposed vertically in the center, and substantially centered horizontally on of the first angled surface 140. The illustrated insertion recesses 142 extend down to the bottom edge of the first angled surface 140 to align with the insertion channels 162 described below. The individual insertion recesses 142 may include different sizing to facilitate different sized bunches of material.

The second angled surface 160 is directly coupled to the first angled surface 140 on a region opposite the top surface 120. Therefore, the second angled surface 160 is on an opposite side or portion of the first angled surface 140 as the top surface 120. The second angled surface 160 is directly coupled to the first angled surface 140 at an internal angle 164 between 90 and 180 degrees. The internal angle 164 is defined as the angle between the first angled surface 140 and the second angled surface 160 toward the cannabis bucking system or facing inward, as shown in FIG. 1D. The nature of the internal angle 144 therefore orients the surface of the second angle surface 160 down away from the user. This orientation has the effect of decreasing the distance to the choke point of the cannabis bucking system. The second angled surface 160 includes a plurality of insertion channels 162 aligned with the insertion recesses 142 of the first angled surface 140. In particular, the insertion recesses 142 are in communication with the insertion channels 162 such that the opening of the insertion recesses 142 connects with the opening of the insertion channels 162. The illustrated insertion channels 162 are substantially rectangular shaped and smaller in width with respect to the insertion recesses 142. The illustrated insertion channels 162 are equidistantly spaced apart, disposed vertically in the center, and substantially centered horizontally on the second angled surface 160. The insertion recesses 162 extend up to the top edge of the second angled surface 160 to align with the insertion recesses 142 described above. The individual insertion channels 162 may include different sizing to facilitate different sized bunches of material. The shapes of the insertion recesses 142 and insertion channels 162 function together to form a substantially conical shape which has a specific beneficial effect on the operation of the plate 100. The second angled surface 160 is further coupled to the bottom surface 180. However, additional angled surfaces may be disposed between the second angled surface 160 and the bottom surface 180 as described below in reference to FIGS. 3A-B.

Figure 2A:
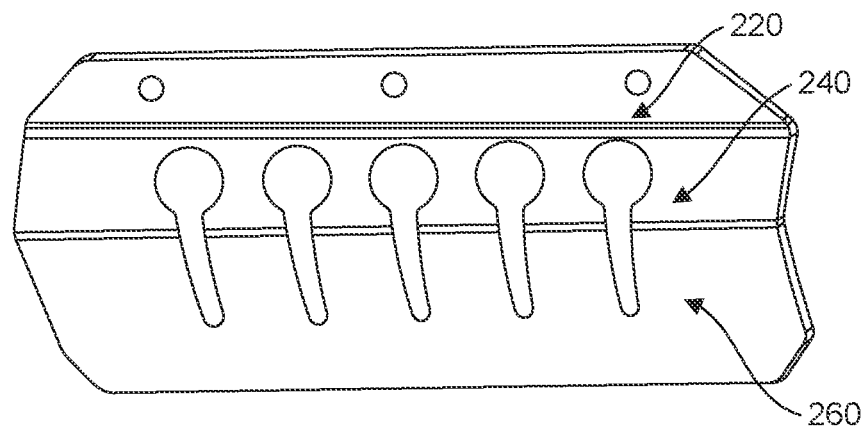
FIG. 2A-B illustrates a plurality of views of an alternative design of a cannabis bucker insertion plate.
Figure 2B:
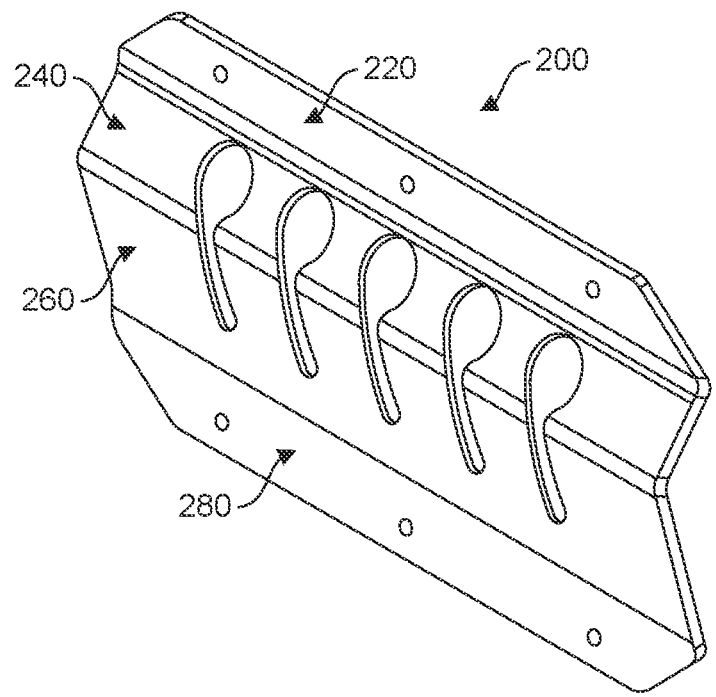

Reference is next made to FIGS. 2A-B which illustrate an alternative embodiment of an insertion plate, designated generally at 200. The insertion plate 200 includes a top surface 220, first angled surface 240, second angled surface 260, and bottom surface 280. The first angled surface 240 includes circular insertion recesses and the second angled surface 260 includes circular insertion channels. The circular shape was determined to be less effective than rectangular shapes through extensive testing.

Figure 3A:
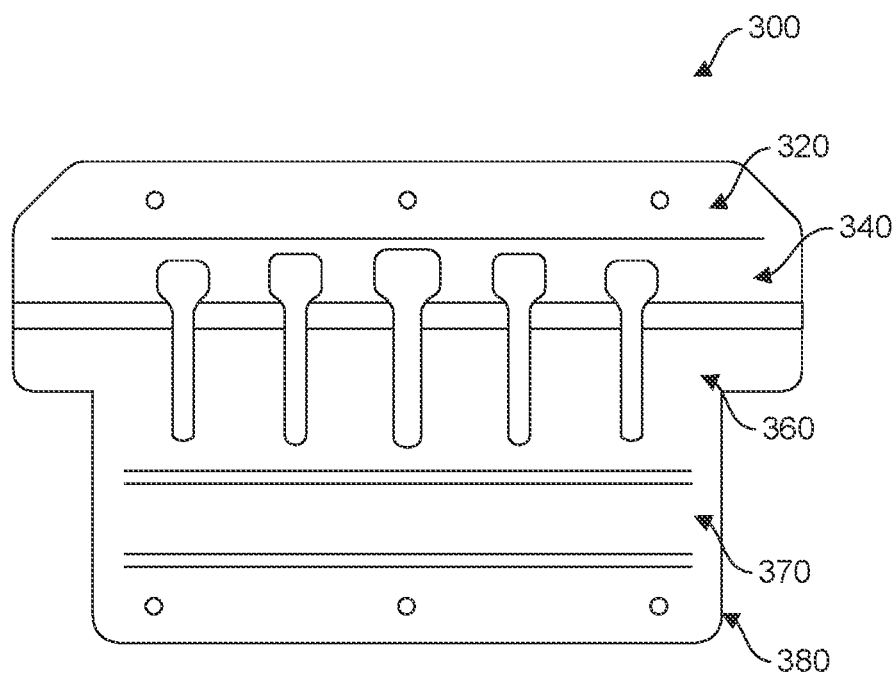
FIG. 3A-B illustrates a plurality of views of an alternative design of a cannabis bucker insertion plate.
Figure 3B:
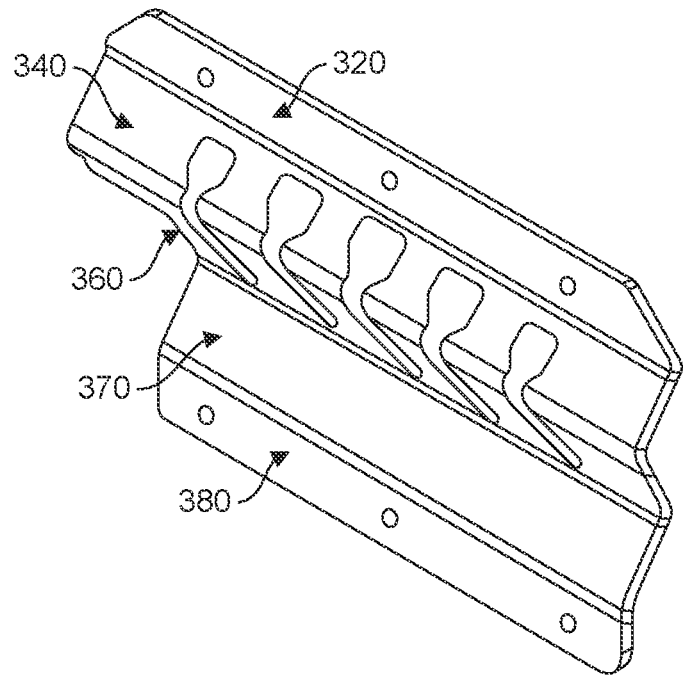

Reference is next made to FIGS. 3A-B which illustrate and alternative embodiment of an insertion plate, designated generally at 300. The insertion plate 300 includes a top surface 320, first angled surface 340, second angled surface 360, a third angled surface 370, and bottom surface 380. As discussed above, additional angled surfaces may be disposed between the second angled surface 340 and the bottom surface 380 to facilitate alternative angle combinations.

Figure 4A:
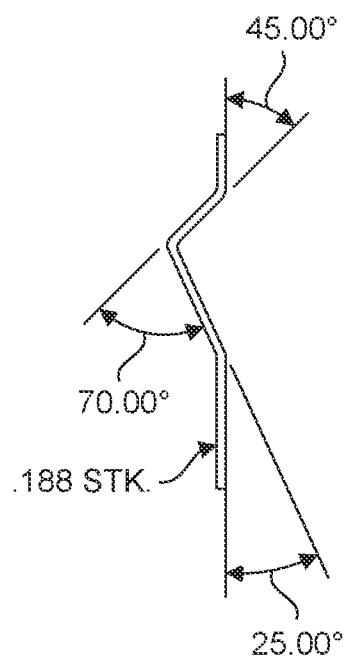
FIGS. 4A-D illustrates a plurality of schematic drawings of contemplated embodiments of cannabis bucker insertion plates accordance with embodiments of the present invention illustrating relative angles between surfaces.
Figure 4B:
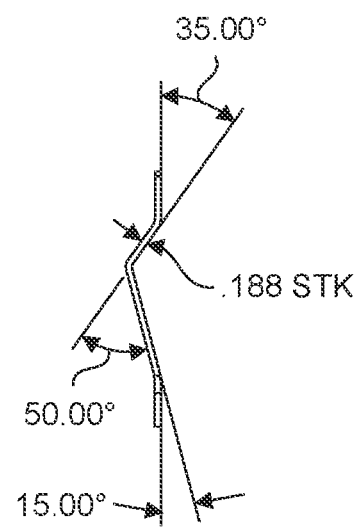
Figure 4C:
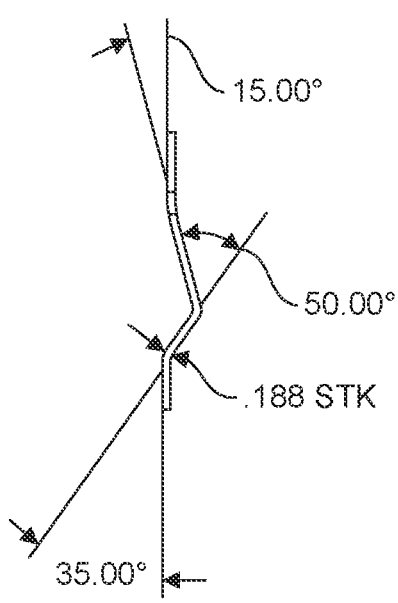
Figure 4D:
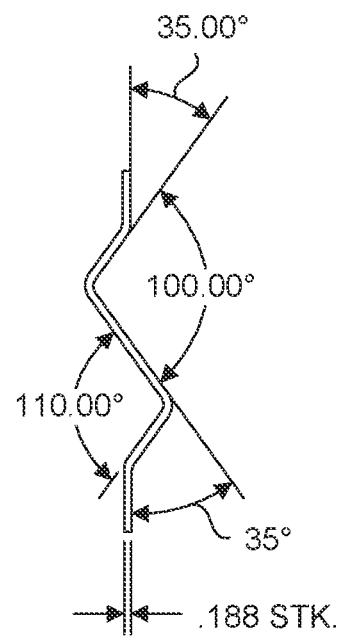

Reference is next made to FIG. 4A-D which illustrates schematic angle drawings of four primary contemplated embodiments of a multi-angle insertion plate in accordance with embodiments of the present invention. FIG. 4A illustrates the embodiment illustrated in FIGS. 1A-D showing the relative angles. FIG. 4B illustrates an alternative embodiment with a smaller external angle between the top surface and first angled surface. FIG. 4C illustrates an alternative embodiment in which the first angled surface is angled inward (concave) and the second angled surface is angled outward. FIG. 4C represents an alternative embodiment in which the angle between the top surface and the first angled surface is an internal angle between 90 and 180 rather than an external angle. And likewise, the angle between the first angled surface and the second angled surface is an external angle between 90 and 180 degrees rather than an internal angle. This configuration creates an insertion plate which is recessed inward toward the cannabis bucking machine. FIG. 4D illustrates an embodiment with a third angled surface between the second angled surface and the bottom surface as described above with respect to FIGS. 3A-B.

It will be appreciated that a housing plate which may be disposed between the insertion plate and the bucker machine to further orient the insertions of cannabis bunches and facilitate the coupling of the insertion plate.

A contemplated non-illustrated embodiment included an open slot rather than a first angled surface with a plurality of first recesses. Experimentation determined that the risk of injury to the feeder/operator with the open slot was too high to warrant implementation.

Embodiments of the present invention also include a method of inserting a cannabis bunch into a bucker. The method includes the acts of initially inserting the cannabis bunch at an elevated incident angle and then lowering it as the bunch is pulled into the bucker.

Figure 5:
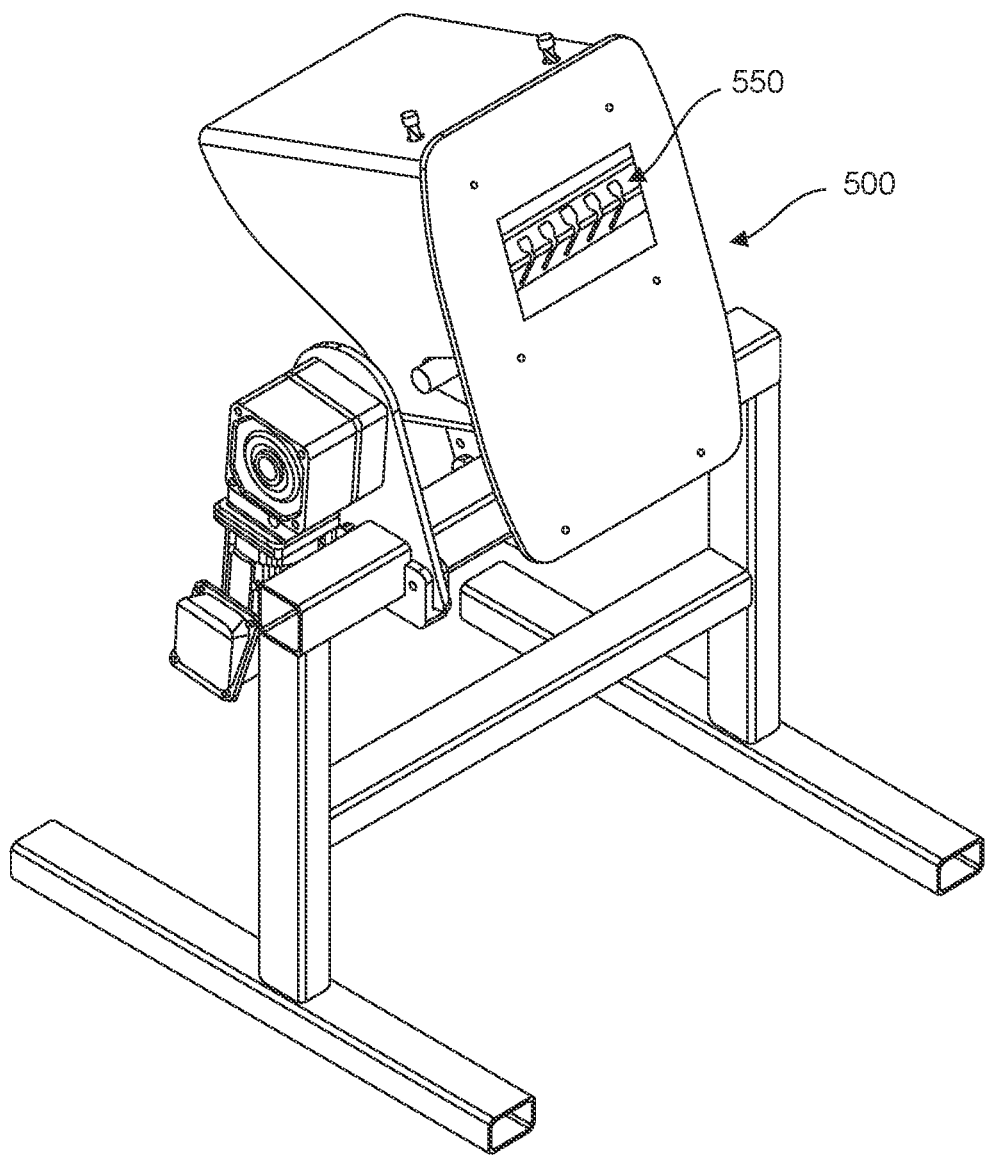
FIG. 5 illustrates a cannabis bucker insertion plate of FIG. 1B disposed in relation to a cannabis bucker machine.

Reference is next made to FIG. 5 to illustrate a cannabis bucker insertion plate 550 disposed on an external surface of a cannabis bucker machine 500. The insertion plate 550 is disposed on an external surface that facilitates the insertion of cannabis bunches to be inserted into the cannabis bucker machine 500.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. An insertion plate disposed on an external surface of a cannabis bucking machine configured to receive cannabis plants containing stems and buds comprising:
   a top surface configured to be oriented substantially orthogonal to a direction of pulling of the cannabis bucking machine;
   a first angled surface directly coupled to the top surface at an external angle between 90 and 180 degrees, wherein the external angle is defined between the first angled surface and the top surface and is opposite the cannabis bucking machine, and wherein the first angled surface includes a plurality of insertion recesses;
   a second angled surface directly coupled to the first angled surface at an internal angle between 90 and 180 degrees, wherein the second angled surface is coupled to an opposite portion of the first angled surface with respect to the top surface, and wherein the internal angle is defined between the first angled surface and the second angled surface and toward the cannabis bucking machine, and wherein the second angled surface includes a plurality of insertion channels aligned with the plurality of insertion recesses; and
   a bottom surface coupled to the second angled surface.

2. The system of claim 1, wherein the system includes a third angled surface disposed between the second angled surface and the bottom surface.

3. The system of claim 2, wherein the bottom surface is disposed adjacent to at least one of the second and third angled surface.

4. The system of claim 1, wherein the plurality of insertion recesses are wider than the plurality of insertion channels.

5. The system of claim 1, wherein the plurality of insertion recesses and insertion channels are correspondingly shaped in a substantially conical configuration.

6. The system of claim 1, wherein the top surface is coupled to the external surface of the cannabis bucking machine.

7. The system of claim 1, wherein the bottom surface is coupled to the external surface of the cannabis bucking machine.

8. The system of claim 1, wherein the insertion recesses are substantially rectangular.

9. The system of claim 1, wherein the insertion recesses are substantially circular.

10. The system of claim 1, wherein the top surface includes plurality of top coupling recesses.

11. The system of claim 1, wherein the bottom surface includes a plurality of bottom coupling recesses.

12. An insertion plate disposed on an external surface of a cannabis bucking machine configured to receive cannabis plants containing stems and buds comprising:
   a top surface configured to be oriented substantially orthogonal to a direction of pulling of the cannabis bucking machine;
   a first angled surface directly coupled to the top surface at an internal angle between 90 and 180 degrees, wherein the internal angle is defined between the first angled surface and the top surface and is toward the cannabis bucking machine, and wherein the first angled surface includes a plurality of insertion recesses;
   a second angled surface directly coupled to the first angled surface at an external angle between 90 and 180 degrees, wherein the second angled surface is coupled to an opposite portion of the first angled surface with respect to the top surface, and wherein the external angle is defined between the first angled surface and the second angled surface and opposite the cannabis bucking machine, and wherein the second angled surface includes a plurality of insertion channels aligned with the plurality of insertion recesses; and
   a bottom surface coupled to the second angled surface.

13. The system of claim 12, wherein the system includes a third angled surface disposed between the second angled surface and the bottom surface.

14. The system of claim 13, wherein the bottom surface is disposed adjacent to at least one of the second and third angled surface.

15. The system of claim 12, wherein the plurality of insertion recesses are wider than the plurality of insertion channels.

16. The system of claim 12, wherein the plurality of insertion recesses and insertion channels are correspondingly shaped in a substantially conical configuration.

17. A method for inserting a cannabis bunch into a bucker system comprising the acts of:
   providing a top surface configured to be oriented substantially orthogonal to a direction of pulling of the cannabis bucking machine
   providing a first angled surface directly coupled to the top surface at an external angle between 90 and 180 degrees, wherein the external angle is defined between the first angled surface and the top surface and is opposite the cannabis bucking machine, and wherein the first angled surface includes a plurality of insertion recesses;
   providing a second angled surface directly coupled to the first angled surface at an internal angle between 90 and 180 degrees, wherein the second angled surface is coupled to an opposite portion of the first angled surface with respect to the top surface, and wherein the internal angle is defined between the first angled surface and the second angled surface and toward the cannabis bucking machine, and wherein the second angled surface includes a plurality of insertion channels aligned with the plurality of insertion recesses;
   providing a bottom surface coupled to the second angled surface; and
   inserting the cannabis bunch at an elevated incident angle into one of the insertion recesses of the first angled surface.

18. The method of claim 17 further including the act of lowering the inserted cannabis bunch from the insertion recesses to the insertion channels of the second angled surface.

19. The method of claim 17 wherein the elevated incident angle of the inserted cannabis bunch corresponds to the external angle between the top surface and the first angled surface.

20. The method of claim 17 wherein the inserted cannabis bunch corresponds geometrically to the area of one of the insertion recesses.

* * * * *